June 3, 1952          J. L. DRAKE          2,598,893

APPARATUS FOR PRODUCING FLAT GLASS

Filed Aug. 20, 1945

Inventor
JOHN L. DRAKE.

By Frank Fraser
Attorney

Patented June 3, 1952

2,598,893

UNITED STATES PATENT OFFICE 2,598,893

APPARATUS FOR PRODUCING FLAT GLASS

John L. Drake, Toledo, Ohio, assignor to Libbey-Owens-Ford Glass Company, Toledo, Ohio, a corporation of Ohio Application August 20, 1945, Serial No. 611,506

1 Claim. (Cl. 49—17)

The present invention relates to the manufacture of flat glass, and more particularly to the conditioning of a sheet or ribbon of glass as it is drawn from a molten bath.

The primary aim of the invention is the provision of improved apparatus for positively and uniformly cooling the sheet at a critical stage in its formation in a manner to materially reduce waves and distortion in the finished product, and to permit sheet glass of better quality to be drawn from a molten bath at a higher rate of speed.

The invention can be practiced in connection with any of the well known sheet glass forming machines now being used commercially, and it will be described here as incorporated into one of the so-called Colburn type machines.

In all of the conventional glass drawing machines, a sheet is drawn upwardly from a mass of molten glass, and considerable difficulty is experienced in attempting to maintain uniform and accurately controlled temperature conditions transversely of the rising sheet. This is due to a number of reasons. In the first place there is always a certain amount of stack effect in the drawing chamber or forming zone of these machines, and this stack effect carries hot air upwardly around the middle of the sheet and at the same time draws relatively cooler air inwardly from beyond the sheet edges.

This continuous movement of air of varying degrees of temperature over the surface of the forming sheet, combined with the convection currents that are naturally set up along the heated surface, result in an uncontrolled turbulence in the atmosphere surrounding the new sheet and which atmosphere is made up of air, gases, products of combustion, etc. Obviously, these random and independent air movements create a diversity of temperature conditions throughout the sheet forming area.

Now the thickness of a sheet or ribbon being drawn in one of these machines is dependent primarily on the viscosity of the glass and the speed at which it is pulled from the molten bath; and when it is understood that the viscosity of the glass in the sheet depends on its temperature and that variations in temperature are quickly translated into variations in thickness of sheet, the importance of maintaining a constant temperature in the sheet forming zone and a uniform temperature transversely of the sheet, will be clearly apparent; as will also the necessity for controlling air movements in the atmosphere surrounding the sheet.

According to this invention, I propose to do both of these things by the provision of a special kind of heat exchanger, arranged within the forming zone, and employing both radiant and controlled convection cooling.

More specifically, this novel heat exchanger includes internally cooled, rotatable members which absorb radiant heat from the sheet along a constantly shifting transverse line, and at the same time move air bodily past the line being cooled.

Another object of the invention is the provision of means associated with the cooling means for removing air from around its periphery.

Still another object is to provide means by which there is set up a circulation of the air within the forming zone of a sheet glass drawing machine by a bodily movement of such air past the sheet being drawn, and by which a portion of said air is removed from an area adjacent the sheet and is transferred to another part of the forming zone.

Further objects and advantages of the invention will become more apparent during the course of the following description when taken in connection with the accompanying drawings.

In the drawings wherein like numerals are employed to designate like parts throughout the same:

Figure 1:
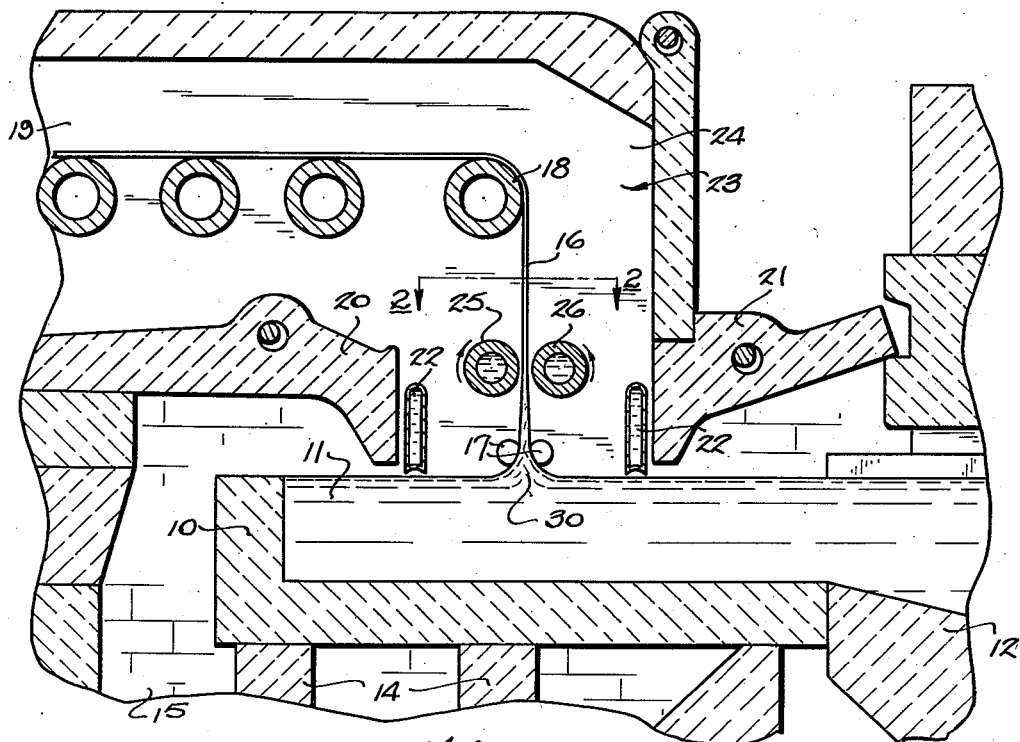
Fig. 1 is a longitudinal, vertical sectional view through a sheet glass drawing machine of the Colburn type.

Referring now more particularly to the drawings, the drawing machine of Fig. 1 includes the usual Colburn working receptacle 10, called the draw pot, which is continuously supplied with molten glass 11 through the cooling chamber 12 of a tank furnace. The pot 10 is mounted on stools 14 in a pot chamber 15 which is heated by suitable gas burners (not shown) to keep the glass in the draw pot at the desired working temperature.

A ribbon of glass 16 is drawn upwardly from the molten bath 11, being held to width by pairs of knurled edge rollers 17, and is then bent into the horizontal plane over a bending roll 18, before being carried through a flattening chamber 19 and an annealing leer (not shown). In these Colburn type machines, the glass ribbon 16 is not cut into individual sheets until after it leaves the leer. Lip-tiles 20 and 21, and lip-tile coolers 22, are provided to shield the rising sheet from blasts of excessively heated air or products of combustion from the pot chamber 15, and from the furnace beyond the cooling chamber 12. The coolers 22 also act to reduce the temperature of the surface of the glass in the bath 11 just before it enters the sheet.

The apparatus so far described is standard equipment on this particular kind of drawing machine. In addition, it is now quite usual on all sheet glass drawing machines to provide machine enclosures at the opposite ends of the drawing chamber 23 as indicated at 24, for the purpose of closing the interior of the machine as completely as possible to the outside air. This has proved to be good practice because it does cut down appreciably on the flow of relatively cold outside air into the machine. Nevertheless, some stack effect will still exist, and there is always a certain amount of infiltration of air through the enclosures, so that the effect is to reduce the unsatisfactory conditions rather than to eliminate them.

On the other hand, with my invention the rising sheet is subjected to a positive cooling action within a definite area transversely thereof, and to a controlled movement of the atmosphere surrounding this area. In other words, this invention actually counteracts, and so can more completely overcome, the effects of the natural air turbulence in the machine and the non-uniform temperatures which such turbulence induces.

I prefer to use my invention in combination with standard machine enclosures, and it has been so illustrated in the drawings. The embodiment shown in Figs. 1 and 2, for example, comprises a pair of internally cooled rolls 25 and 26, mounted one on either side of the sheet 16 and entirely within the enclosure 24. By this means, radiant heat will be constantly and uniformly absorbed from the glass in the sheet along a line transversely thereof that is opposite the longitudinal center lines of the cooling rolls. At the same time this line of cooling will be constantly shifting as the sheet 16 rises past these rolls.

Figure 2:
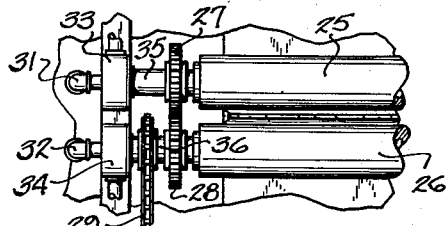
Fig. 2 is a fragmentary section taken substantially on the line 2—2 in Fig. 1.

To make the cooling action of the rolls 25 and 26 even more uniform, they are adapted to be continually rotated in opposite directions, counter to the direction of travel of the sheet, by means of gears 27 and 28 and chain and sprocket drive 29, connected to a suitable source of power (not shown), (Fig. 2).

In order to obtain the best results, I prefer to position the rolls 25 and 26 about as shown in Fig. 1, that is, in close proximity to the rising sheet and some distance above the bath 11. It will be noted that as the sheet 16 is pulled from the molten bath, it creates an enlarged base portion or meniscus 30, and that this meniscus grows progressively thinner and thinner as the sheet is drawn upward until it becomes substantially set, and so attains its final dimension, somewhere between the bath 11 and the bending roll 18.

As pointed out above, the thickness of the glass sheet is determined by the speed at which it is drawn and by the viscosity of the glass. As an example of this, the faster glass of a given viscosity is drawn, the thinner it will become before it becomes substantially set, and to produce a thicker sheet it is necessary to slow down the speed of draw.

Now one of the advantages of the positive and uniform transverse cooling of the sheet made possible by this invention is that a sheet being formed may be made to set up more quickly than heretofore, and without any injurious effects. As a consequence, the sheet may be made to attain its final thickness dimension within a shorter time, with the result that sheets of given thicknesses can be drawn at higher speeds.

Within limits, the location of the rolls 25 and 26 can be shifted to compensate for various conditions such as temperature, thickness of sheet desired, extreme atmospheric conditions and so forth. However, insofar as possible, I prefer to mount them about at the height where it is desired to have the sheet set to final form, and close enough to the rising sheet to baffle or interrupt the natural convection currents that will be set up along the heated surface.

It has been already pointed out that these rolls are internally cooled and this may be accomplished in any suitable and well known manner. In Fig. 2 I have shown an arrangement which may be used and which includes stationary pipes 31 and 32, leading into the rolls, and outlet manifolds 33 and 34 communicating with the rotatable, hollow roll shafts 35 and 36. The greatest absorption of heat from the sheet will be along a line parallel with the longitudinal centerline of the rolls, which is their closest approach to the surface of the sheet. At either side of this line a gradually decreasing cooling action will be exerted as the periphery of the roll curves away from the sheet.

In addition to the radiant cooling action exerted by the rolls 25 and 26, and the fact that they will act to baffle the natural convection currents set up along the surface of the sheet 16, they will also exert a controlled convection cooling action on the sheet over the same area. This is because the rotating surfaces of the rolls also act to move a thin stream of air continuously past the sheet in the direction of their rotation. The speed at which the air stream is moved will be controlled by the speed of rotation of the rolls, and its direction by the direction of roll rotation.

I prefer to rotate the cooling rolls at a fairly high speed and in a direction opposite to the movement of the drawn sheet. This will set up a rather rapidly moving air stream traveling downwardly over the sheet, or in a direction opposite to the flow of the natural convection currents in this area.

The temperatures, and speeds at which the cooling rolls are operated, as well as their exact positions will be determined by the particular conditions encountered. In some cases, particularly where there is a temperature differential between the opposite sides of the glass sheet being formed, a single cooling roll may be sufficient to obtain the desired results. Ordinarily, however, it is advisable to use them in pairs and to compensate for temperature differentials by controlling the amount of cooling exerted. In this connection it should be pointed out that two or more pairs of rolls mounted one above the other may also be employed if desired.

As explained, the bodily movement of the cooling rolls sets up a controlled circulation of the air within the chamber 23, or more particularly within the actual forming zone, which is the area bounded by the lip-tile coolers 22 at either side, the enclosures 24 at either end, and lies below the bending roll 18.

Besides replacing the turbulent atmosphere that would naturally be found in this area, the controlled air movement just described also counteracts the effect of the natural and uncontrolled air movements therein by moving in the opposite direction. Furthermore, since the circulation within the forming zone is set up without the use of any outside air, it will not affect the balanced air condition within the machine.

Figure 3:
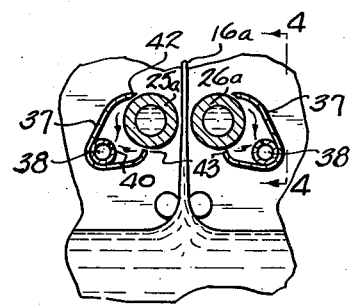
Fig. 3 is a fragmentary view similar to Fig. 1, showing a modified form of the conditioning apparatus.
Figure 4:
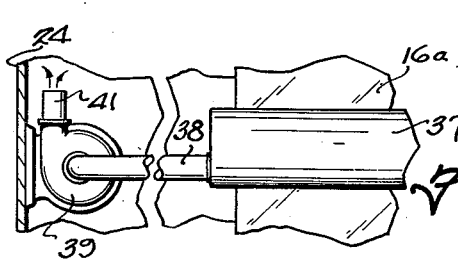
Fig. 4 is a fragmentary view of the air exhausting casing for one of the coolers, looking in the direction of the arrows on the line 4—4 in Fig. 3.

The modified form of the invention disclosed in Figs. 3 and 4 is adapted to provide an increased circulation of air, which circulation also involves only the air already within the sheet forming zone. The structure used is exactly the same as for the embodiment shown in Figs. 1 and 2 except that an air exhausting casing 37 is associated with each of the rolls 25a and 26a. As shown, the casings 37 are of substantially V-shape in cross section, and embrace approximately one-half of the peripheries of the rolls on the side away from the sheet 16a. These casings are closed at their ends and are of substantially the same length as their respective rolls, extending for a short distance past the glass sheet at either end.

The supporting means for the casings 37 are the pipes 38, secured in the apex of the V and extending outwardly beyond the casing ends. One end of each of these pipes is connected to the intake side of a blower 39 mounted on an inside wall of the enclosure 24, and openings 40 are provided throughout the length of the pipes to withdraw air from the casings in a definite pattern from one end to the other. The exhaust pipe 41 of the blower 39 may be carried outside of the enclosure 24, but I prefer to exhaust the air from the casings 37 within the enclosures to maintain the balanced air condition therein.

It will be noted that the longitudinally extending ends 42 and 43 of the casings 37 fit quite closely to the peripheries of the rolls 25a and 26a. In this way only very thin streams of air can be drawn therebetween. The presence of the casings 37 serve a number of purposes. Their action contributes to the uniform cooling action of the rolls 25a and 26a. In addition, they confine the bodily movement of air, by the cooling rolls, to the side of the rolls that is adjacent the surface of the sheet. At the same time they set up a certain amount of controlled circulation of the air in the drawing chamber by removing air from the vicinity of the sheet, across a critical area, and transferring it to another part of the chamber.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In the Colburn machine for producing sheet glass, a working receptacle containing a bath of molten glass, means for drawing a continuous sheet upwardly from said bath, a bending roll for deflecting the sheet from the vertical into the horizontal plane, lip-tiles mounted above the bath of molten glass at opposite sides of the sheet, coolers positioned at opposite sides of the sheet inwardly of and adjacent said lip-tiles, a pair of rotatable cylindrical cooling rolls positioned on opposite sides of said sheet between said bath of molten glass and bending roll with the peripheries of said rolls spaced from but in close proximity to the surface of the sheet being drawn, means for circulating a cooling medium through said rolls to subject said sheet to an accelerated radiant cooling action along a line transversely thereof and to a gradually lessening cooling action on either side of said line, means for rotating said rolls in a direction opposite to the movement of the drawn sheet to simultaneously move air bodily over the line of radiant cooling, casings fitting over a portion of the periphery of said rolls substantially the same length as said rolls and closed at their ends and means associated with said casings for withdrawing air therefrom.

JOHN L. DRAKE.

REFERENCES CITED

The following references are of record in the file of this patent:

UNITED STATES PATENTS

| Number | Name | Date |
|---|---|---|
| 1,657,212 | Hitchcock | Jan. 24, 1928 |
| 1,657,214 | Kutchka | Jan. 24, 1928 |
| 2,077,377 | Drake | Apr. 20, 1937 |
| 2,125,914 | Haight | Aug. 9, 1938 |
| 2,158,669 | Amsler | May 16, 1939 |
| 2,201,286 | Bundy | May 21, 1940 |
| 2,246,053 | Magrini | June 17, 1941 |
| 2,278,328 | Magrini | Mar. 31, 1942 |
| 2,387,886 | Devol | Oct. 10, 1945 |
| 2,444,731 | Devol | July 6, 1948 |